United States Patent [19]

Yang

[11] Patent Number: 5,845,956

[45] Date of Patent: Dec. 8, 1998

[54] AUTO-WINDSHIELD SHELTER APPARATUS WITH MOUNTING DEVICE

[76] Inventor: Tzu Tsan Yang, 4517 Rip Van Winkle, Las Vegas, Nev. 89102

[21] Appl. No.: 942,804

[22] Filed: Oct. 2, 1997

[51] Int. Cl.$^6$ ....................................................... B60J 3/02
[52] U.S. Cl. ............................................................. 296/97.8
[58] Field of Search ............................................ 296/97.8

[56] References Cited

U.S. PATENT DOCUMENTS 5,615,729   4/1997   Matsumoto et al. ..................... 296/97.8

*Primary Examiner*—Gary C. Hoge
*Attorney, Agent, or Firm*—David & Raymond; Raymond Y. Chan

[57] ABSTRACT

An auto-windshield shelter apparatus with mounting device includes a receiver having a first end and a second end, an extensible means connected on the first end of the receiver for flexibly adjusting a length of a mounting device during installation, a supporting means connected on the second end of the receiver for providing support to one end of said mounting device, a shelter which is normally received within the receiver, and a shelter locking means is connected to an outer end of the shelter for affixing the shelter in position when the shelter is in used. The auto-windshield shelter apparatus with mounting device provides the extensible means to firmly affixed the automobile windshield shelter apparatus in place, so that the user would not have to worry about the fall off or dry out of the suckers of the conventional mounting device.

10 Claims, 5 Drawing Sheets

AUTO-WINDSHIELD SHELTER APPARATUS WITH MOUNTING DEVICE

FIELD OF THE PRESENT INVENTION

The present invention relates to an auto-windshield shelter apparatus, and more particularly to an auto-windshield shelter apparatus with a mounting device designed to affix the auto-windshield shelter apparatus to the front or back windshield of the vehicle, in which the mounting device provides adequate supporting pressure to make sure that the auto-windshield shelter apparatus would be tightly mounted in place and also easy to removed when desire.

BACKGROUND OF THE PRESENT INVENTION

There are millions of vehicle accessories designed to make road travel more comfortable and convenient. One of the accessories is to provide some sort of shading, sheltering, or tanning for the vehicles windshield to avoid the direct radiation attack from the sun light while parking under the sun. We all have the experience of having to enter our vehicle which is around 120 degree Fahrenheit after an hour under the summer sun, but with the sheltering accessory covering the vehicle windshield during parking, the temperature inside the vehicle can be effectively reduced, and thus make the driving and riding more comfortable.

Because some sorts of sheltering enhance the comfort of the driver and the passengers during traveling, there are many new production on the market try to provide such alternative choices as of how to provide sheltering. A common example of such product is the conventional auto-windshield shelter apparatus with mounting device as shown in FIG. 1. The traditional auto-windshield shelter apparatus comprises a receiver 100, a mounting device 110 for mounting the auto-windshield shelter apparatus on the windshield of the vehicle, a shelter 115 which is normally received in the receiver 100, and a front handle 114 which is affixed to an open end of the shelter 115, wherein the mounting device 110 further comprises two suckers 111, 112 affix to the receiver 100 for affixing the auto-windshield shelter apparatus to the auto-windshield, and at least a third sucker 113 which is affixed to the front handle 114 for fixing the shelter 115 during opening stage.

However, the conventional auto-windshield shelter apparatus having the suckers as the mounting device has at least the four following shortcomings: 1) The suckers 111, 112, and 113 have a tendency to dry out and crack after they are exposed to the sun after certain period of usage. 2) After the suckers 111, 112, are put on the windshield for a period of time, they might loose the strength to hold the receiver 100. 3) When the return shelter 115 rolled back into the receiver 100, the return snap might loosen the sucker 111, 112, or in the worst case pull the suckers 111 and 112 out of the windshield. 4) The suckers 111, 112, 113 need to have a smooth and clean surface to attach, when the windshield is dirty, the ability for the suckers 111, 112, and 113 to stay thereon is therefore affected.

SUMMARY OF THE PRESENT INVENTION

The main objective of the present invention is to provide an auto-windshield shelter apparatus with mounting device which provides an extensible means to firmly mount the automobile windshield shelter apparatus in place, so that the user would not have to worry about the fall off or dry out of the suckers of the conventional mounting device.

Another objective of the present invention is to provide an auto-windshield shelter apparatus with mounting device which can be positioned horizontally (or even vertically) across a front and a back windshield of the vehicle so as to reduce the direct sun light radiation attacking on human skin while parking under the sun, and thus to effectively reduce the temperature inside the vehicle to make driving or riding of the vehicle much more enjoyable.

Another objective of the present invention is to an auto-windshield shelter apparatus with mounting device which has a cap that when the mounting device is in use, the cap is used as a holder for one end of the mounting device; and when the mounting device is not in use, the cap is used as a lock to compress the extensible means to a minimum length by having an inner screw stopper of the cap engaged with an outer screw stopper provided on an outer surface of the auto-windshield shelter apparatus.

Another objective of the present invention is to provide an auto-windshield shelter apparatus with mounting device which further provides an universal ball joint for attaching to a free end of the extensible means, so that the auto-windshield shelter apparatus can be limitly adjusted to different position.

Accordingly, an auto-windshield shelter apparatus with mounting device comprises a receiver having a first end and a second end, an extensible means connected on the first end of the receiver for flexibly adjusting a length of a mounting device during installation, a supporting means connected on the second end of the receiver for providing support to one end of said mounting device, a shelter which is normally received within the receiver, and a shelter locking means which is connected to an outer end of the shelter for affixing the shelter in position when the shelter is in used.

The receiver comprises a container for receiving the shelter, and a slot is vertically provided across a full length of the container for allowing the shelter to pull out therefrom.

The first end of the receiver has provided a first outer screw thread portion, and a second outer screw thread portion; and the second end of the receiver has provided a third outer screw thread portion wherein, a diameter of the first outer screw thread portion is smaller than a diameter of the second outer screw thread portion, and the diameter of the second outer screw thread portion is equal to a diameter of the third outer screw stopper.

The extensible means comprises at least two hollow extensible shaft namely a first hollow extensible shaft, and a second hollow extensible shaft which is adjustably connected to the first hollow extensible shaft. A supporting head is adjustably connected to the second hollow extensible shaft. An elastic spring, which is coaxially positioned in the two hollow extensible shaft with one end prop against the first end of the receiver and another prop against the supporting head, has set with predetermined modulus of elasticity to provide adequate resistance force for maintaining the extensible means to be normally fully extended.

The supporting means comprises a cap which has an inner screw thread portion provided on an inner surface wall, wherein the inner screw thread portion is used to engage with the third outer screw thread portion of the second end of the receiver.

The shelter further has a stopper attached to an outer end thereof, which has a size larger than a size of the slot of the receiver, for ensuring the outer end of the shelter to always stay outside of the slot of the receiver.

The shelter locking means comprises at least a clip attached to the stopper, and at least a corresponding clip mount pre-glued on the windshield of the vehicle, so that the shelter is fixed in place by locking the clip to the corresponding clip mount.

DETAILED DESCRIPTION OF THE PREFERRED EMBODIMENT

Figure 1:
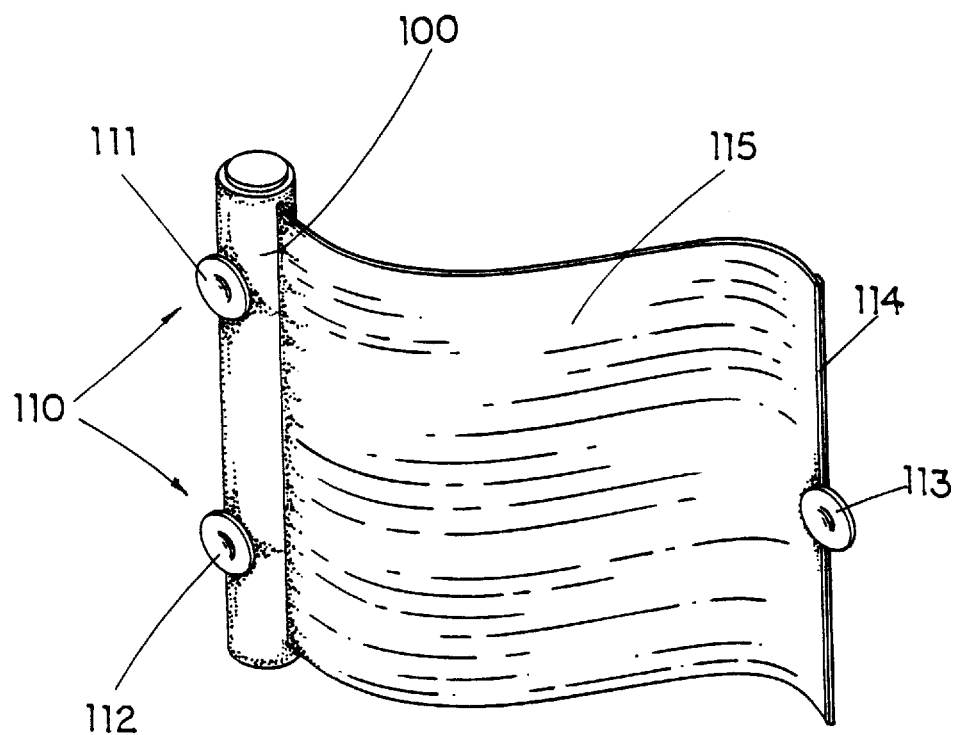
FIG. 1 is a perspective view of a conventional auto-windshield shelter apparatus with mounting device.

Referring to FIG. 2 to FIG. 6 of the drawings, according to a first preferred embodiment of the present invention of an auto-windshield shelter apparatus with mounting device is illustrated. The auto-windshield shelter apparatus with mounting device comprises a receiver 10 having a first end 11 and a second end 12, an extensible means 20 connected on the first end 11 of the receiver 10 for flexibly adjusting a length of a mounting device during installation, a supporting means 30 connected on the second end 12 of the receiver 10 for providing support to one end of said mounting device, a shelter 40 which is normally received within the receiver 10, and a shelter locking means 50 which is connected to an outer end 41 of the shelter 40 for affixing the shelter 40 in position when the shelter 40 is in used.

Figure 2:
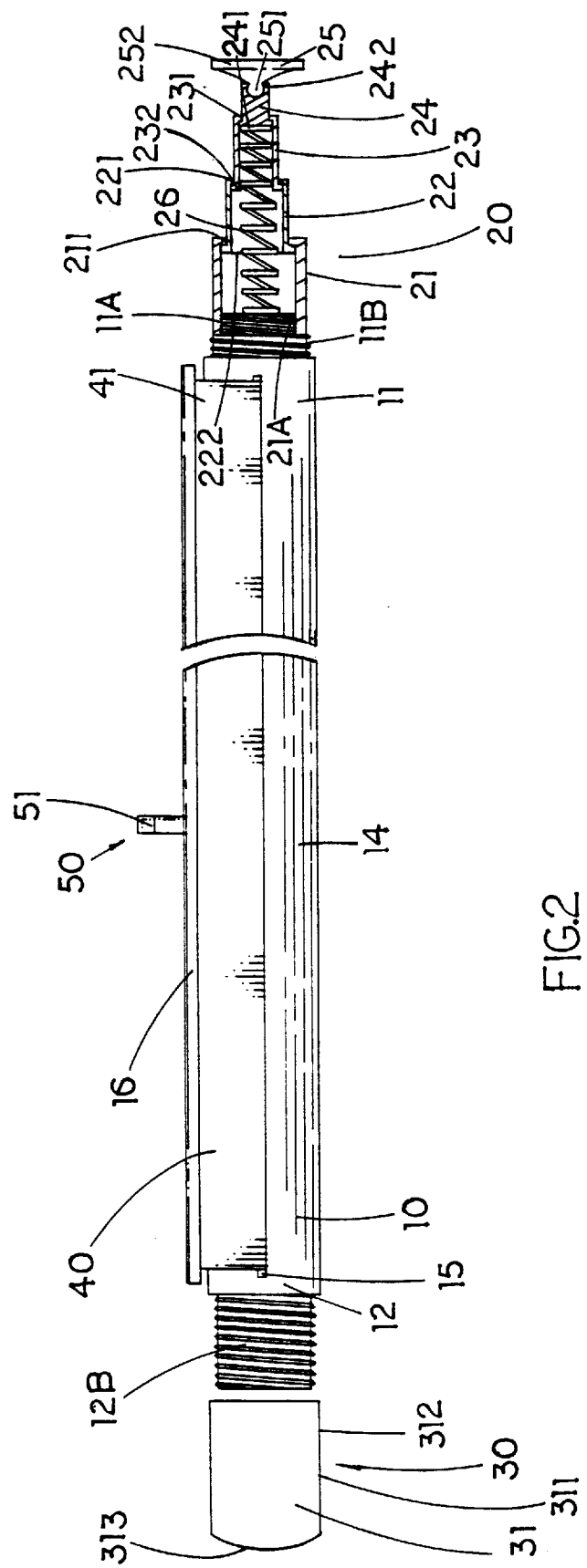
FIG. 2 is a sectional view of an auto-windshield shelter apparatus with mounting device according to a first preferred embodiment of the present invention.

As shown in FIG. 2 of the drawing, the receiver 10 comprises a container 14 for receiving the shelter 40, and a slot 15 is vertically provided along the full length of the container 14 for allowing the shelter to pull out therefrom. The outer end 41 of the shelter 40 is attached with a stopper 16 which has a size larger than the size of the slot 15 of the receiver 10, so that the outer end 41 of the shelter 40 would always be stopped to stay outside of the slot 15 of the receiver 10. The first end 11 of the receiver 10 has provided a first outer screw thread portion 11, and a second outer screw thread portion 11B; and the second end 12 of the receiver 10 has provided a third outer screw thread portion 12B, wherein a diameter of the first outer screw thread portion 11A is smaller than a diameter of the second outer screw thread portion 11B, which is equal to a diameter of the third outer screw thread portion 12B.

The extensible means 20 comprises a first hollow extensible shaft 21, a second hollow extensible shaft 22 which is coaxially inserted into the first hollow extensible shaft 21, a third hollow extensible shaft 23 which is coaxially inserted into the second hollow extensible shaft 22, a supporting head 24 is adjustably connected to the third hollow extensible shaft 23, a cushion stand 25 is connected to the supporting head 24, and an elastic spring 26 which is coaxially positioned in the first, second and third hollow extensible shaft 21, 22, 23 with one end propping against said first end of said receiver and another end propping against said supporting head. The elastic spring 25 has been set with a predetermined modulus of elasticity to provide an adequate resistance force to press the second hollow extensible shaft 22 coaxially extended from the first hollow extensible shaft 21 and the third hollow extensible shaft 23 coaxially extended from the second hollow extensible shaft 22 for maintaining the extensible means to be normally fully extended to a maximum length thereof.

A diameter of the first hollow extensible shaft 21 is slightly larger than a diameter of the second hollow extensible shaft 22. The diameter of the second hollow extensible shaft 22 is slightly larger than a diameter of the third hollow extensible shaft 23. A length of the first hollow extensible shaft 21 is equal to a length of the second hollow extensible shaft 22 and a length of the third hollow extensible shaft 23, so that when an external axial force which is greater than the resistance force provided by the elastic spring is applied to the extensible means, the third hollow extensible shaft 23 is able to be completely inserted into the second hollow extensible shaft 22, and the second hollow extensible shaft 22 is also able to be completely inserted into the first hollow extensible shaft 21. When the external axial force is removed, the second hollow extensible shaft 22 and the third hollow extensible shaft 23 are fully extended back to their normal position.

The first hollow extensible shaft 21 has an inner screw thread portion 21A provided at a bottom portion thereof for engaging with the first outer screw thread portion 11A of the first end 11 of the receiver 10. A top portion of the first hollow extensible shaft 21, which is hollow at center for receiving the second hollow extensible shaft 22, has an engaging rim 211. A bottom portion of the second hollow extensible shaft 22 has a protruding safety rim 222 which is abutted against the engaging rim 211 of the first hollow extensible shaft 21. The third hollow extensible shaft 23 is identical to the second hollow extensible shaft 22 except that it has a smaller diameter. A top portion of the second hollow extensible shaft 22, which is hollow at center for receiving the third hollow extensible shaft 23, has an engaging rim 221. A bottom portion of the third hollow extensible shaft 23 which has a protruding safety rim 232 is abutted against the engaging rim 221 of the second hollow extensible shaft 22. A top portion of the third hollow extensible shaft 23, which is hollow at center for receiving the supporting head 24, has an engaging rim 231.

The supporting head 24 has an engaging base 241 at a bottom portion thereof, which is pressured against the engaging rim 231 of the third hollow extensible shaft 23, and a receiving chamber 242 disposed at a top portion thereof. The cushion stand 25 has an engaging head 251 to insert into the receiving chamber 242 of the supporting head 24, and a flat end 252 for pressuring against the dashboard or windshield of the vehicle.

The installation steps for the extensible means 20 are:

1) inserting the supporting head 24 from the bottom portion of the third hollow extensible shaft 23, so that the engaging base 241 is abutted against the engaging rim 231 of the third hollow extensible shaft 23;

2) inserting the third hollow extensible shaft 23 along with the supporting head 24 from the bottom portion of the second hollow extensible shaft 22, so that the engaging base 232 is abutted against the engaging rim 221 of the second hollow extensible shaft 22;

3) inserting the second hollow extensible shaft 22 along with the third hollow extensible shaft 23 and the supporting head 24 from the bottom potion of the first hollow extensible shaft 21, so that the engaging base 222 is abutted against the engaging rim 211 of the first hollow extensible shaft 21;

4) inserting the engaging head 251 of the cushion stand 25 into the receiving chamber 242 of the supporting head 24;

5) positioning the elastic spring 26 within the center hollow portion of the extensible shaft; and 6) engaging the inner screw stopper 21A of the first hollow extensible shaft 21 with the outer screw thread portion 11A of the first end 11 of the receiver 10.

It is worth to mention that the extensible means 20 may just comprise the first hollow extensible shaft 21 and the second hollow extensible shaft 22, that is eliminating the third hollow extensible shaft 23, or even just the first hollow extensible shaft 21 by control and adjust the length of the first and/or second hollow extensible shaft 21, 22 to be adequate for the length of the distance that the auto-windshield shelter apparatus is going to be installed.

The supporting means 30 comprises a cap 31 which has an inner screw thread portion 311 on an inner surface wall 312, wherein the inner screw thread portion 311 is used to engage with the third outer screw thread portion 12B of the second end 12 of the receiver 10. The cap 31 further has a smooth outer base surface 313 for pressing against the dashboard or the windshield of the vehicle.

Figure 3:
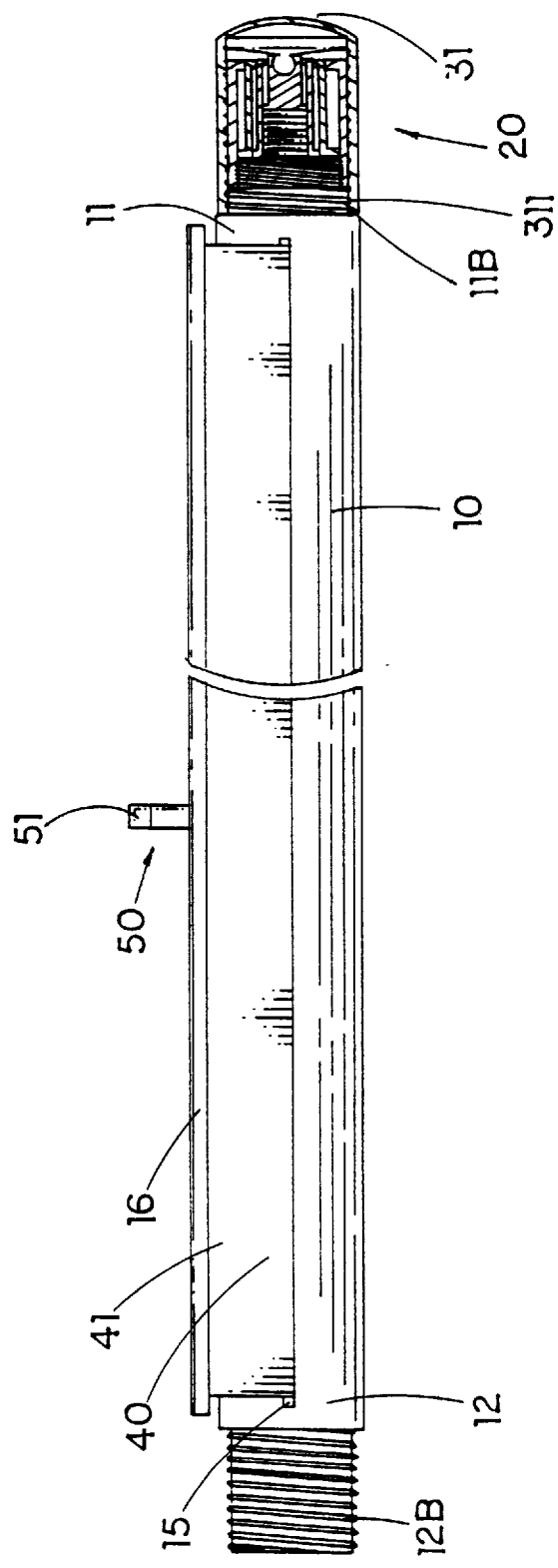
FIG. 3 is a sectional view of the auto-windshield shelter apparatus with mounting device according to the above first preferred embodiment of the present invention, in which the auto-windshield shelter apparatus is not in use and the cap has compressed the extensible means.

As shown in FIG. 3 of the drawing, the cap 31 further has a special function which is able to compress the extensible means 20 to a minimum size when the mounting device for auto-windshield shelter apparatus is not in used. The inner screw thread portion 311 of the cap 31 can also be engaged with the plurality of second outer screw thread portion 11B of the first end 11 of the receiver 10, which means the size of the second outer screw thread portion 11B of the first end 11 of the receiver 10 is identical to that of the third outer screw thread portion 12B of the second end 12 of the receiver 10. A length of the cap 31 has to be greater than a length of the first hollow extensible shaft 21, so that the inner screw thread portion 311 of the cap 31 can be engaged with the second outer screw thread portion 11B of the first end 11 of the receiver 10.

The shelter locking means 50 comprises at least a clip 51 attached to the stopper 16 and at least a corresponding clip mount 52 pre-glued on the windshield of the vehicle, so that the shelter 40 is fixed in place by locking the clip 51 to said corresponding clip mount 52. The shelter locking means 50 can also affixing the shelter 40 in position by locking the clip 51 to a reflecting mirror M or a shader S which are already pre-installed in all vehicles.

Figure 4:
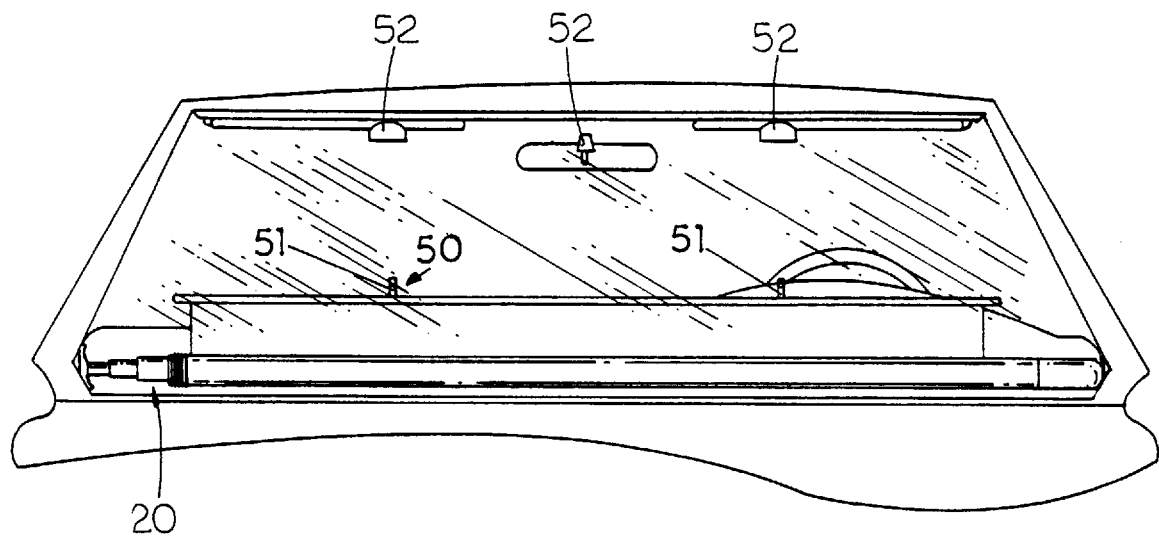
FIG. 4 is a front view of the auto-windshield shelter apparatus with mounting device for horizontally positioned on a front or a back windshield of the vehicle according to the above first preferred embodiment of the present invention.

Referring to FIG. 4 of the drawing, according to the first preferred embodiment of the present invention of the auto-windshield shelter apparatus with mounting device positioned on a front (or back) windshield of a vehicle is illustrated. According to FIG. 4, the mounting device is positioned horizontally at a bottom position of the front or the back windshield of the vehicle, wherein the supporting means 30 is first inserted in one side of the vehicle, and the extensible means 20 is pressured back and inserted on an other side of the front dashboard, or back dashboard of the vehicle, so that when the pressure applied on the extensible means is released, the auto-windshield shelter apparatus with mounting device is firmly mounted in position. The clip mount 52 of the shelter locking means 50 can be pre-glued on the top of the windshield, so that when the user pull out the shelter by the clip 51, the clip can be attached to the clip mount 52.

Figure 5B:
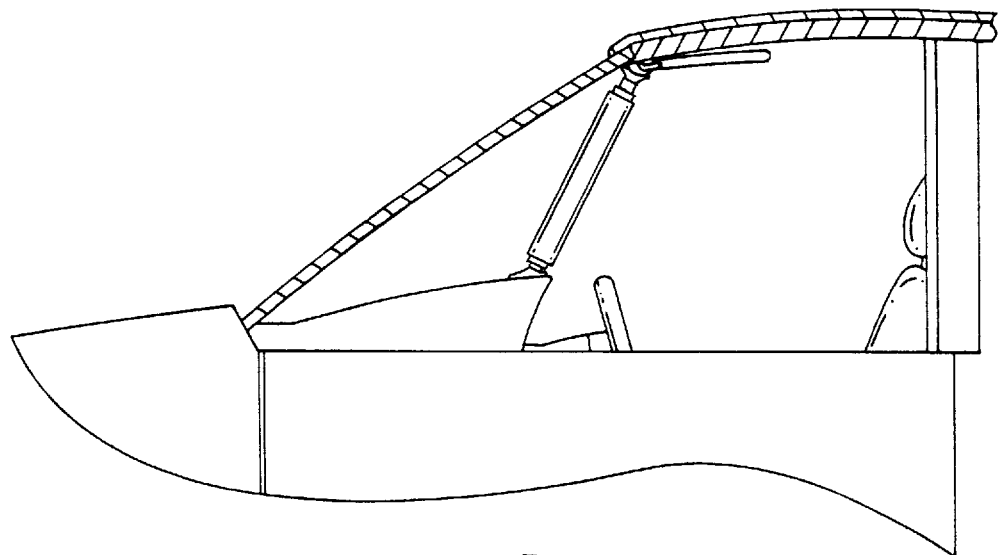
FIG. 5B is an end view of the auto-windshield shelter apparatus with mounting device vertically positioned on the front or the back windshield of the vehicle according to the above first preferred embodiment of the present invention.
Figure 5A:
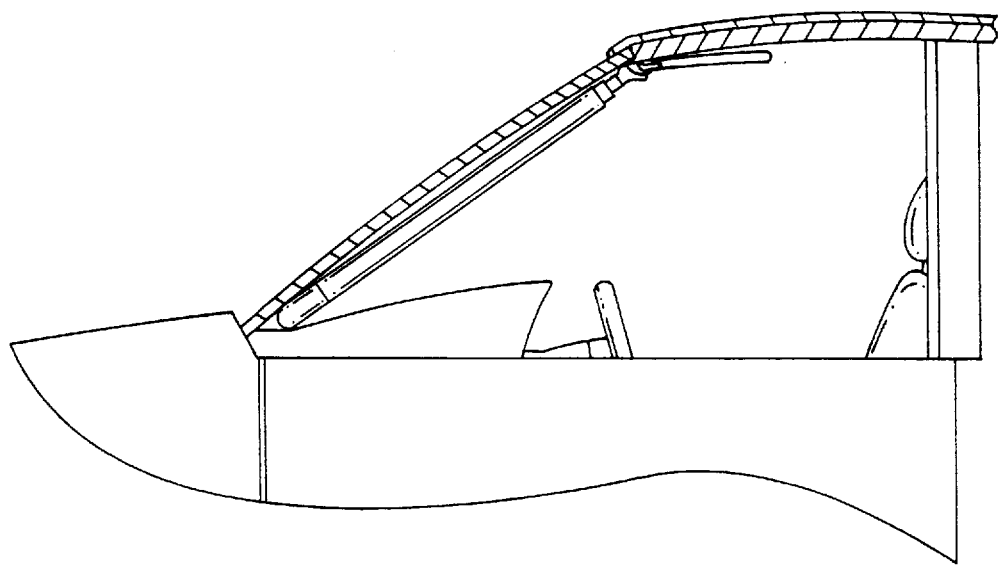
FIG. 5A is an end view of the auto-windshield shelter apparatus with mounting device inclinedly positioned on the front or the back windshield of the vehicle according to the above first preferred embodiment of the present invention, in which the auto-windshield shelter apparatus is paralleled to the windshield.

Referring to FIGS. 5A, and 5B of the drawings, according to a the first preferred embodiment of the present invention of the auto-windshield shelter apparatus positioned with mounting device on the front (or back) windshield of the vehicle is illustrated. According to FIG. 5A, the auto-windshield shelter apparatus with mounting device of the present invention can also be inclinedly positioned and paralleled to a front or back windshield of the vehicle. The shelter would be pull from left to right or right to left direction instead of the down to up or up to down direction of the horizontally positioned mounting device. According to FIG. 5B, the auto-windshield shelter apparatus with mounting device of the present invention can also be vertically positioned on a front or back windshield of the vehicle.

Figure 6:
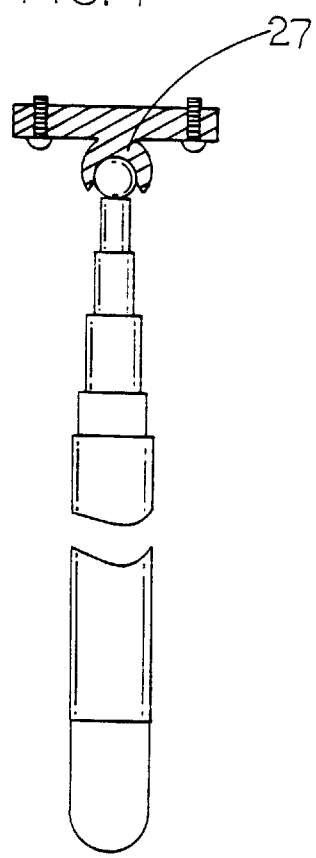
FIG. 6 is a front view of the auto-windshield shelter apparatus with mounting device according to a second preferred embodiment, wherein the mounting device further provide an universal ball joint to replaced the cushion stand for allowing the mounting device to be able to turn at different angles.

As shown in FIG. 6, the auto-windshield shelter apparatus with mounting device of the present invention further provide an universal ball joint 27 to replaced the cushion stand 25 for allowing the mounting device to be able to turn at different angles.

It is worth to mention that both the first end 11 and the second end 12 of the receiver 10 can be connected with just two supporting means 30 or just two extensible means 20 respectively on each of the first end 11 and the second end 12. There can be two caps 31 for each of the first end 11 and the second end 12 of the receiver 10. Also the auto-windshield shelter apparatus with a mounting device of the present invention can not only be installed on the front and rear windshield, but also can be adjusted with properly length to be installed on the side windshield of the vehicle.

I claim:

1. An auto-windshield shelter apparatus with a mounting device, comprising a receiver having a first end and a second end;

at least an extensible means connected to said first end of said receiver for flexibly adjusting a length of said mounting device during installation; and a shelter which is normally received inside said receiver; wherein said receiver comprising a container for receiving said shelter and having a slot vertically provided along a full length of said container for allowing said shelter to pull out therefrom;

said extensible means comprising at least a first hollow extensible haft and a second hollow extensible shaft adjustably connected to said first hollow extensible shafts, a supporting head is connected to said second hollow extensible shaft, and an elastic spring which is coaxially positioned in said two hollow extensible shaft, one end of said elastic spring being propped against said first end of said receiver and another end of said elastic spring being propped against said supporting head, the elastic spring being set with a predetermined modulus of elasticity to provide an adequate resistance force for maintaining the extensible means to be normally fully extended.

2. An auto-windshield shelter apparatus with a mounting device, as recited in claim 1, further comprising a supporting means attached on said second end of said receiver for providing support to one end of said mounting device, a shelter locking means which is connected to an outer end of said shelter for affixing said shelter in position when said shelter is in used; wherein said first end of said receiver providing a first outer screw thread portion, and a second outer screw thread portion, said second end of said receiver having provided a third outer screw thread portion, wherein a diameter of said first outer screw thread portion is smaller than a diameter of said second outer screw thread portion, and said diameter of said second outer screw thread portion is equal to a diameter of said third outer screw thread portion;

said supporting means comprising a cap which has an inner screw thread portion on an inner surface wall, wherein said inner screw thread portion is used to engage with said third outer screw thread portion of said second end of said receiver; wherein said cap further has a special function which is able to reduce said extensible means to a minimum size, when said auto windshield shelter apparatus with mounting device is not in used said inner screw thread portion of said cap is engaged with said second outer screw thread portion of said first end of said receiver;

said shelter further having a stopper attached to an outer end thereof, which has a size larger than a size of said slot of said receiver, for ensuring said outer end of said shelter being stayed outside of said slot of said receiver.

3. An auto-windshield shelter apparatus with a mounting device, as recited in claim 2, wherein said shelter locking means comprising at least a clip attached to said stopper, and at least a corresponding clip mount pre-glued on a windshield of a vehicle, so that said shelter is affixed in place by locking said clip to said corresponding clip mount.

4. An auto-windshield shelter apparatus with a mounting device, as recited in claim 3, wherein a diameter of said first hollow extensible shaft is slightly larger than a diameter of said second hollow extensible shaft and a length of said first hollow extensible shaft is equal to a length of said second hollow extensible shaft, so that when an external axial force which is greater than a resistance force provided by said elastic spring is applied to said extensible means, said second hollow extensible shaft is completely inserted into said first hollow extensible shaft, and when said external axial force is removed, said second hollow extensible shaft is fully extended.

5. An auto-windshield shelter apparatus with a mounting device, as recited in claim 4, wherein said first hollow extensible shaft has an inner screw thread portion provided at a bottom portion thereof for engaging with said first outer screw thread portion of said first end of said receiver; a top portion of said first hollow extensible shaft, which is hollow at center for receiving said second hollow extensible shaft, having an engaging rim, a bottom portion of said second hollow extensible shaft having a protruding safety rim abutted against said engaging rim of said first hollow extensible shaft; a top portion of said second hollow extensible shaft, which is hollow at center for receiving said supporting head, having an engaging rim, a bottom portion of said supporting head having a protruding safety rim which is abutted against said engaging rim of said second hollow extensible shaft.

6. An auto-windshield shelter apparatus with a mounting device, as recited in claim 5, wherein said extensible means further provides a cushion stand which has an engaging head inserting into a receiving chamber of said supporting head, and a flat end for positioning between the extensible means.

7. An auto-windshield shelter apparatus with a mounting device, as recited in claim 6, wherein said extensible means further provides an universal ball joint which has an engaging head inserting into a receiving chamber of said supporting head for allowing said mounting means to be able to turn at different angles.

8. An auto-windshield shelter apparatus with a mounting device, as recited in claim 7, further comprising an third hollow extensible shaft having a diameter smaller than said diameter of second hollow extensible shaft and a length equal to a length of said second hollow extensible shaft, wherein a bottom portion of said third hollow extensible shaft has a protruding safety rim which is abutted against said engaging rim of said second hollow extensible shaft, a top portion of said third hollow extensible shaft, which is hollow at center for receiving said supporting head, having a engaging rim; a bottom portion of said supporting head having a protruding safety rim abutted against said engaging rim of said third hollow extensible shaft.

9. An auto-windshield shelter apparatus with a mounting device, as recited in claim 3, wherein said clip mount is a reflective mirror.

10. An auto-windshield shelter apparatus with a mounting device, as recited in claim 3, wherein said clip mount is a shader.

* * * * *